W. M. Mason.
Corn Harvester.

No. 2,200.
33,204.

Patented Sep. 3 1861.

Witnesses:

Inventor:
W. M. Mason

UNITED STATES PATENT OFFICE.

WM. M. MASON, OF POLO, ILLINOIS.

IMPROVEMENT IN CORN AND CANE HARVESTERS.

Specification forming part of Letters Patent No. 33,201, dated September 3, 1861.

*To all whom it may concern:*

Be it known that I, W. M. MASON, of Polo, in the county of Ogle and State of Illinois, have invented a new and Improved Corn and Cane Harvester; and I do hereby declare that the following is a full, clear, and exact description of the same, reference being had to the annexed drawings, making a part of this specification, in which—

Figure 1:
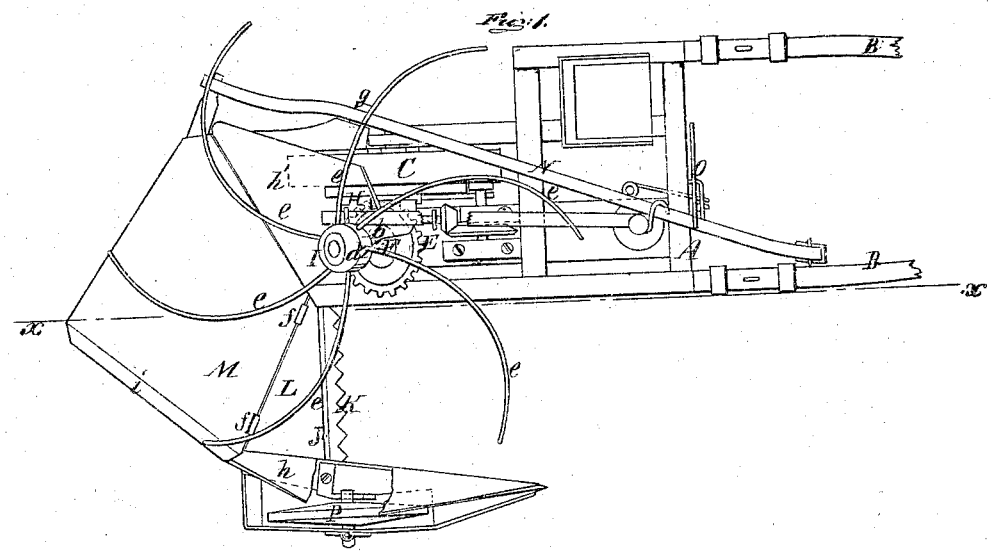
Figure 2:
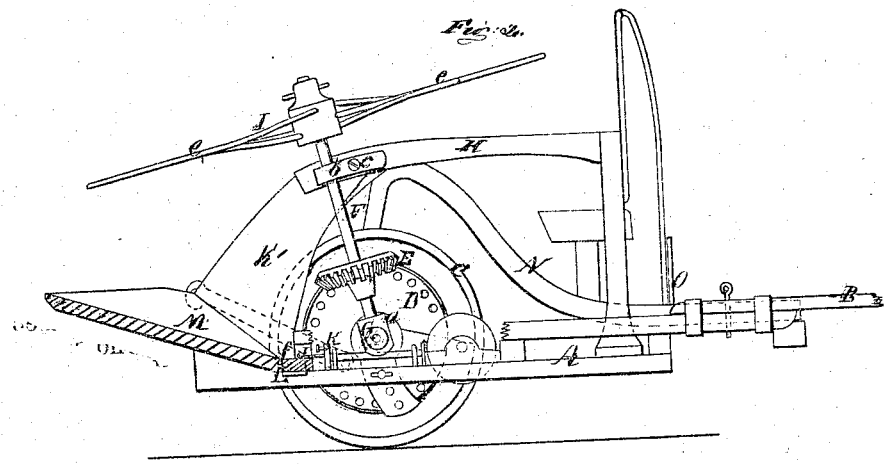

Figure 1 is a plan or top view of my invention; and Fig. 2, a side sectional view of the same, taken in the line $x\ x$, Fig. 1.

Similar letters of reference indicate corresponding parts in the two figures.

This invention relates to a machine for cutting standing corn and cane and depositing the same in gavels on the ground.

The invention consists in the employment or use of an adjustable inclined reel, in connection with a tilting platform and cutting device, arranged substantially as and for the purpose set forth.

To enable those skilled in the art to fully understand and construct my invention, I will proceed to describe it.

A represents the main frame of the machine, to which draft thills or shafts B B are attached, and C is the driving-wheel, which is placed in the main frame, and has a toothed wheel, D, secured concentrically to it, the wheel D gearing into a pinion, E, which is on a shaft, F, the latter being fitted in a step, $a$, which is placed on the axle G of the driving-wheel C. The upper bearing, $b$, of the shaft F is attached to a bar, H, the back part of which is curved, forming a part of a circle of which the axle G of the driving-wheel is the center. The bearing $b$ is attached to the bar H by means of a screw, $c$, which may pass through any of a series of holes in the bar, according to the desired inclination of the shaft F.

On the upper end of the shaft F there is secured a reel, I. This reel is formed of a hub, $d$, and curved arms $e$, the form of the latter being distinctly shown in Fig. 1. The arms $e$ may be made of metal rods of a suitable diameter.

To the back part of the main frame A there is attached at right angles a bar, J, having a reciprocating sickle, K, adjusted to it, which sickle is operated by suitable mechanism from the driving-wheel C. A triangular platform, L, is secured to the back of bar J, and to the back edge of the platform L a tilting platform, M, is attached by hinges or joints $f$. The platform M is allowed to work or swing freely on its hinges or joints $f$, and said platform is connected at its back end to a lever, N, the fulcrum $g$ of which is in the main frame A. The lever N extends beyond the front end of the main frame A, and is sufficiently heavy at its front part to keep the platform M, when empty, upward in proper position to receive the cut stalks or cane. A catch, O, is placed at the front end of the main frame A to hold the front end of lever N down, so that the load on platform M cannot tilt it until the lever N is freed from the catch O by the driver. The outer end of the platform L has a guide or wing, $h$, attached, and a guide or wing, $h'$, is also attached to the back end of the main frame A. A guard-plate, $i$, is secured to the outer side of the tilting platform M. The reel I works over the sickle or cutting device and the tilting platform M, the reel being slightly inclined, so as to throw, as it revolves, the stalks or cane to the sickle, to enable the latter to operate efficiently, and also to throw the cut stalks or cane on the platform M, and a greater or less degree of obliquity may be given the reel I, according to the height of the stalks or cane, by adjusting the upper bearing, $b$, of the shaft F. The tilting platform M has an oblique position relatively with the stationary platform L, as shown clearly in Fig. 1, so that the stalks or cane will be discharged at the back of the main frame A, and thereby leave an unobstructed track for the horse. The outer end of the stationary platform L is supported by a wheel, P, the axis $j$ of which has its inner end fitted in a slotted plate, $k$, the slot in the plate being oblong, as shown at $l$ in Fig. 1. This oblong slot $l$ admits of the wheel P shifting its position when the machine is turned, so that the wheel P will conform to the arc of the circle described by it as the machine is turned. The driver's seat Q is at the front part of the main frame A, and in such a relative position with the catch O as to enable the driver to actuate the latter with his foot. When a sufficient quantity of stalks or corn to form a gavel has been deposited on the platform L, the driver actuates the catch O, and thereby releases the lever N. The platform M then tilts and discharges its load, and when the platform is empty it rises to its proper position under the superior gravity of the front part of lever N, which may be loaded, if desired.

I do not claim the combination of a horizontally-operating reel and a tilting platform with a weighted lever, as such devices have been used in conjunction for delivering the cut crop at intervals directly behind the machine; but

What I claim as new, and desire to secure by Letters Patent, is—

The arrangement of the adjustable reel I in an inclined position, to operate in combination with the obliquely-hinged platform M, tilting lever N, and spring-catch O, in the manner and for the purpose described.

WM. M. MASON.

Witnesses:
   F. FISHER,
   SAMUEL WOLF.